Feb. 21, 1967

G. L. CLAPPER 3,305,847

ADAPTIVE MEMORY DEVICE

Filed Dec. 19, 1963

2 Sheets-Sheet 1

INVENTOR.
GENUNG L. CLAPPER

BY

ATTORNEY

INVENTOR.
GENUNG L. CLAPPER
BY
[signature]
ATTORNEY

United States Patent Office 3,305,847
Patented Feb. 21, 1967

3,305,847
ADAPTIVE MEMORY DEVICE

Genung L. Clapper, Vestal, N.Y., assignor to International Business Machines Corporation, New York, N.Y., a corporation of New York Filed Dec. 19, 1963, Ser. No. 331,775
8 Claims. (Cl. 340—173)

This invention relates to adaptive memory devices, and more particularly relates to an adaptive memory device employing a new principle, herein termed transcoherence.

An adaptive device is one which when designed into an appropriate system modifies its own characteristics in response to its experience so as to attain a performance appropriate in view of such experience. In short, it learns by doing.

In general, adaptive systems are designed around adaptive memory devices which exhibit variable gain with memory. If the output of the system agrees with the desired output, the values of the variable gains are not changed. If the output does not agree, the variable gains are altered so that it does. In adaptive terminology, these gains are called weights, and they may have positive or negative values. The weight setting determines how much effect an input will have upon the output. Adaptive memory has uses in computing systems, control systems, bionic systems, and elsewhere.

Central to the development of the new art of adaptive memory systems is the search for components exhibiting adaptive memory. In an article entitled "Components That Learn, and How To Use Them" in the March 22, 1963, issue of Electronics, a McGraw-Hill publication, pp. 49–53, the search for such components and the state-of-the-art are described. It is considered that no wholly satisfactory device has yet been conceived, and that ultimately a range of devices based upon diverse physical phenomena will find use as adaptive memory components in a number of separate categories of uses.

It is the principal object of the present invention to provide a new adaptive memory device.

Another object of the invention is to provide an adaptive memory device operating on an entirely new principle from those heretofore known.

Another object of the invention is to provide an adaptive memory device wherein a dual coherer having a common terminal exhibits the new phenomena termed transcoherence upon which the adaptive memory capability of the device is founded.

Another object of the invention is to provide an adaptive memory device that requires no driving power to adapt upon a conditioning signal or to hold a set once attained.

Yet another object of the invention is to provide means for employing such an adaptive memory device in a generalized adaptive system.

The foregoing and other objects, features and advantages of the invention will be apparent from the following more particular description of preferred embodiments of the invention, as illustrated in the accompanying drawings.

In the drawing.

Similar reference characters denote similar parts in each of the several views.

Briefly described, the present invention provides an adaptive memory device in which a new principle has been discovered and applied to provide adaptive memory. It has been discovered that a dual coherer, the dual coherer parts of which are contiguous or nearly contiguous, exhibits the property that a relatively large current through a previously cohered one of said dual parts increases the impedance of that by decoherence thereof, and at the same time and without passing through the second dual part, decreases the impedance in that second dual part by coherence thereof. The phenomenon is reversible, and stepwise operable and is thus very advantageously suited to use as an adaptive memory.

The phenomenon underlying the operation of the device has been termed transcoherence. While no theory is proposed to explain why coherence breakdown current in a first of the dual coherer parts tends to cause coherence buildup in the second dual part, a possible explanation is that major intergranular arcing in the first part breaks down coherence therein and at the same time generates electromagnetic waves that are received by the second part and cause build up of coherence therein. In any event the increase in impedance in the breakdown current part is matched step by step by decrease in impedance in the other part. Moreover the whole process can be reversed by merely applying the breakdown current to the other of the dual coherers.

The build up of coherence in the other part depends only on a decohering current existing in the first part, and not necessarily on the existance of decohering in the first part. That is to say, decohering current even in a totally decohered part causes coherence buildup in the other part. Thus it is a feaure of the invention that even if both parts are totally decohered, the device allows of stepwise adjustment, because a conditioning signal applied initially to either totally decohered part will not increase the impedance of that part due to its already existing total decoherence, but will build up coherence in the other part thus starting the reversible relationship of coherence and decoherence between the two parts. In other words, the device is initially self setting.

The device may employ a wide range of known coherer granular materials, and is also suited for use with granular materials which have been bonded grain to grain into a solid coherer by use of an interstitial bonding agent. When appropriately employed in an adaptive memory circuit, as will be pointed out in the detailed description contained hereinbelow, the present device has very advantageous adaptive memory characteristics.

Figure 1:
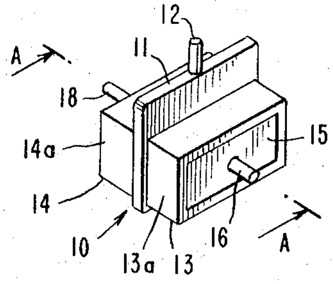
FIG. 1 is a diagrammatic representation in perspective view of one manner of construction of an adaptive memory device in accordance with the invention.
Figure 2:
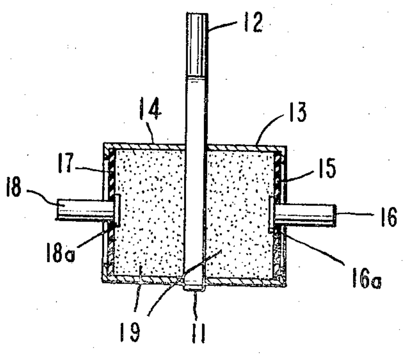
FIG. 2 is a cross section view of the device shown in FIG. 1 taken along plane A—A therein and showing internal details of construction.

Considering now the details of the invention, FIGS. 1 and 2 show one embodiment of the inventive principles wherein the adaptive memory device 10 comprises a central electrode 11 having a terminal 12. Mounted on opposed faces of electrode 11 are chambers indicated generally at 13, 14. The interior volumes of chambers 13, 14 are preferably of equal proportions, and are defined by the opposed faces of electrode 11, annular walls 13*a*, 14*a* and respective chamber electrode assemblies. The chamber electrode assembly associated with chamber 13 comprises retaining member 15 which closes the entire end of chamber 13 opposed to central terminal 11, and terminal 16 mounted through retaining member 15 and having an inner flanged electrode portion 16a bonded to the face of retaining member 15 nearest to central electrode 11. Similarly, chamber 14 is closed by retaining member 17 having terminal 18 therethrough with electrode portion 18a bonded thereto at the face thereof nearest to central electrode 11.

Chambers 13, 14 each containing granules 19 filling the entire volume thereof and constituting the coherable material. For the purpose of this description, the term coherable material is to be understood to mean any substance composed of particles, usually granular in form, which, when exposed to a suitable electrical signal voltage, tends to form conductive chains of particles, such conductive chains being disrupted when a suitable current is caused to flow therethrough. Examples of such substances are powdered metals such as nickel, tin and aluminum, and powdered carbon.

It will be seen that each body of coherable material 19 has in common the central electrode 11, and in addition has a second electrode 16, 18 respectively. All modes of construction that present this relationship will yield a useful adaptive memory device in accordance with the inventive principles. In the example shown in FIGS. 1, 2 this relationship is achieved by fabricating retaining members 15, 17 in an electrical insulating material, while annular walls 13a, 14a are fabricated from metal stock, as are of course, electrodes 11, 16 and 18. It is also possible to fabricate retaining members 15, 17 from metal stock and annular walls 13a, 14a from insulating material. Many other possible modes of construction which yield the appropriate electrical relationship between the electrodes 11, 16, 18 and the two bodies of coherable material 19, will be apparent to those skilled in the art. All such modes that present the two coherable bodies 19 in contiguous or nearly contiguous relationship are contemplated within the scope of the invention.

Figure 3:
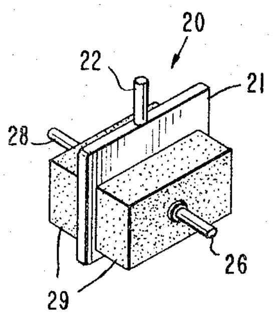
FIG. 3 is a diagrammatic representation in perspective view of a second manner of construction of an adaptive memory device in accordance with the invention.

In FIG. 3 is shown an alternative embodiment of an adaptive memory device according to the invention. The device, indicated generally at 20, comprises a central electrode 21 having a terminal 22. Mounted on opposed faces of electrode 21 are bodies of coherable material 29, and mounted to each body 29 are electrodes 26, 28 respectively. In general, construction and relationship of all the parts are directly analogous to those described in detail in the first embodiment of FIGS. 1 and 2. However, in the device illustrated in FIG. 3 the coherable bodies 29, instead of being comprised of discrete particles as is material 19 of FIG. 2, are instead comprised of particles bonded together with a suitable non-conductive bonding agent so that each body 29 has structural integrity thus rendering unnecessary encapsulating expedients such as members 13a, 14a, 15, 17 shown in FIGS. 1 and 2. Electrodes 26, 28 are thus mounted directly to bodies 29, which bodies are in turn mounted directly to central electrode 21. In addition to serving to simplify the assembly, utilization of the embodiment of FIG. 3 renders the device insensitive to mechanical shocks and mechanical vibrations. Coherers that have established the aforesaid conductive chains of particles are well known to have a tendency to decohere when mechanically agitated. Thus for those adaptive memory applications where such agitations are expected, the embodiment of FIG. 3 is a useful expedient to avoid that difficulty.

In creating the bodies 29 of FIG. 3, the same coherable materials may be employed as already were described in connection with the embodiment of FIGS. 1 and 2. The binder with which the coherable substance is mixed may be of any suitable type which is substantially non-conductive and which may be cured by heat or evaporation to form a solid or semi-solid resultant mixture. For example, materials such as epoxy resins, or polyvinyl alcohol, known by their trade names as "Pliobond," "Resistoflex" and "Formvar" are suitable. The ratio of coherable granules to binder may vary from approximately 2:1 to 1:2 by volume.

The aggregate is mixed, molded and cured by techniques well known to the art. Electrodes 21, 26, 28 may expeditiously be applied to bodies 29 by first plating the appropriate portions of bodies 29 by electrodeposition followed by soldering to the electrodes, or by other techniques well known to the art. It will be clear, that the embodiment of FIG. 3 may be enclosed in chambers similar to that of FIGS. 1 and 2 if so desired, or that either embodiment may be encapsulated by well known techniques such, for example, as by "potting" with non-conductive material.

Figure 4:
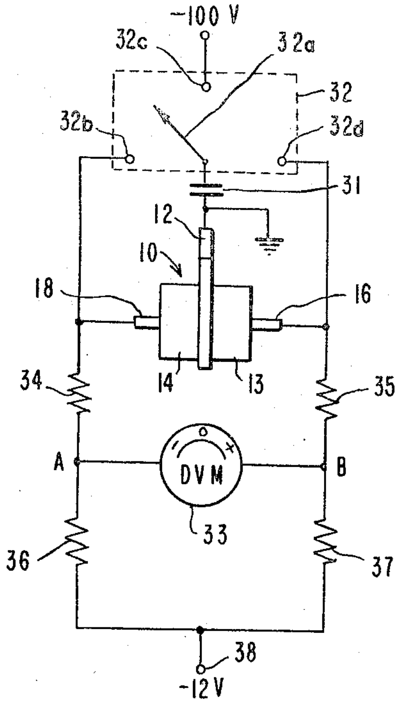
FIG. 4 is a diagrammatic view of a circuit adapted to illustrate the characteristics of the adaptive memory device according to the invention.
Figure 5:
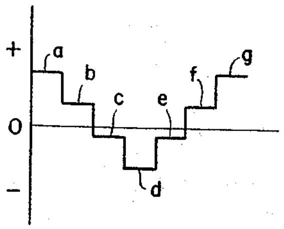
FIG. 5 is a graphical representation of voltages measurable during operation of the circuit of FIGURE 4.

The operative characteristics of an adaptive memory device according to the invention may be best understood by consideration of the circuit FIG. 4 indicated generally at 30 when taken with the voltage graph of FIG. 5. An illustrative device according to the invention is shown generally at 10 in FIGURE 4 with common terminal 12, coherer chambers 13, 14 and associated terminals 16, 18 respectively, all as already described. Alternative device 20 could also, of course, be so employed.

Common terminal 12 is connected in FIG. 5 to the grounded side of capacitor 31. The other side of capacitor 31 is connected to the selector pole 32a of selector switch 32 and may be connected thereby to any of switch terminals 32b, 32c or 32d. Terminal 32c is connected to a negative source of potential (not shown) having a value of, for example, 100 volts. Terminals 32b and 32c are connected respectively to terminals 18 and 16 of adaptive memory device 10. A differential voltmeter 33 is connected in a bridge circuit including resistances 34, 35, 36, 37, wherein adaptive memory device 10 is connected between resistances 34, 35 so that coherer 14 is in the branch with resistance 34 and coherer 13 is in the branch with resistance 35, and terminal 12 is the terminal of those two branches, while terminal 38 is the terminal for the other two branches containing 36, 37. Terminal 38 is connected with a source of negative potential (not shown) of, for example, 12 volts. The various resistances are chosen so that when coherer portions 13 and 14 are of equal impedance, the differential voltmeter 33 will read zero.

With the foregoing circuit the adaptive memory operation of the device may be demonstrated. Assume that capacitor 31 is either uncharged or at least not connected to either of terminals 32b and 32d. Assume further that the coherer body contained within chamber 14 has previously been cohered, while that within chamber 13 has not. Thus the impedance of chamber 14 will be lower than that of chamber 13, that branch will draw more current, and differential voltmeter 33 will read the voltage of point B with respect to point A as positive, as shown at step *a* in FIG. 5. Unless modified this set on the device will persist.

Now when capacitor 31 is connected via pole 32a to a negative voltage source of the magnitude shown at terminal 32c, capacitor 31 will accept a charge. When pole 32a is switched to terminal 32b that charge will discharge through coherer side 14 at a rate determined by the circuit values as well as the capacitance of capacitor 31. The current surge through the cohered material in side 14 will cause a decoherence step therein which will raise the impedance thereof. At the same time, and as a result thereof, a coherence step will be taken by the coherable material within side 13, thus decreasing the impedance thereof.

The net effect will be to move the differential voltmeter reading a step away from its previous positive reading. Thus in FIG. 5 the voltage is lowered from *a* to *b*. By repeatedly charging capacitor 31 and discharging it through side 14 the additional steps *c* and *d* in FIG. 5 may be effected. Of course, the total range and number of steps depends upon the adjustment of the various circuit values, particularly the degree of coherability of the device 10 and the value of capacitor 31, its discharge path, and its charging voltage.

It will be understood immediately by those skilled in this art that the capacitor current represents a conditioning signal, and that it may be applied as aforesaid until the relative weight setting between the two coherers matches a desired value. When the desired value is attained, the dual coherer will maintain it until it receives further instructions. It remains to be shown that the device is stepwise and selectively reversible, so that it can act as an adaptive memory by adjusting in either direction depending upon its instructions.

The stepwise shifting of voltage balance may be reversed at any point by merely discharging capacitor 31 through the opposite side of device 10. Thus continuing the illustrative example, capacitor 31 is charged as aforesaid, and discharged in steps through side 13 of device 10 to produce the steps *e*, *f*, and *g* away from the negative shown in FIG. 5. The actions are thus totally reversible and the side 13 which was previously stepwise cohered by the discharging through side 14, is now stepwise decohered by discharging through it, which at the same time results in stepwise cohering in side 14. As before, the decohering is caused directly by the discharge current, while the cohering in the mated side of device 10 is caused by an "action-at-a-distance" principle not fully understood, and hereinabove termed transcoherence.

Broadly viewed therefore, an adaptive memory device according to the invention, and illustrated specifically by the embodiments described, comprises a pair of coherable material bodies arranged in spaced contiguous relationship so that the impedance of either of said bodies has a tendency to be lowered within limits by the existance of a decohering current in the other of said bodies.

The device is thus seen to be capable of receiving and holding a set in either of two directions and to be reversibly and selectively stepwise operable toward or away from either set by the application of a single appropriately directed conditioning signal. Moreover, as has already been pointed out, either or both of the coherer parts may be totally decohered before the first conditioning signals are applied. The device thus is ideally suited to use in an adaptive memory circuit, and such use will now be illustrated.

Figure 6:
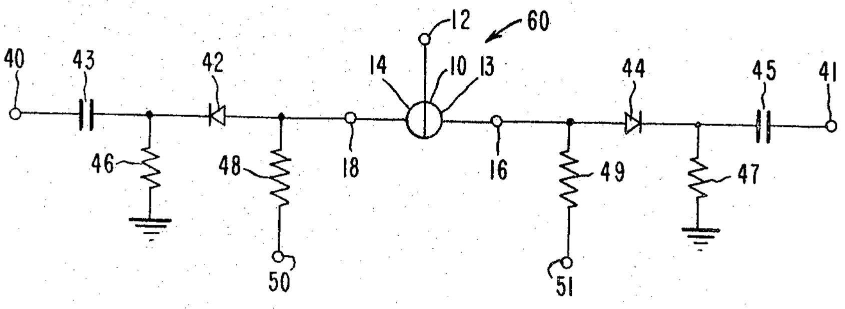
FIG. 6 is a diagrammatic representation of an adaptive memory device according to the invention employed with one possible array of means to constitute an adaptive memory cell.
Figure 7:
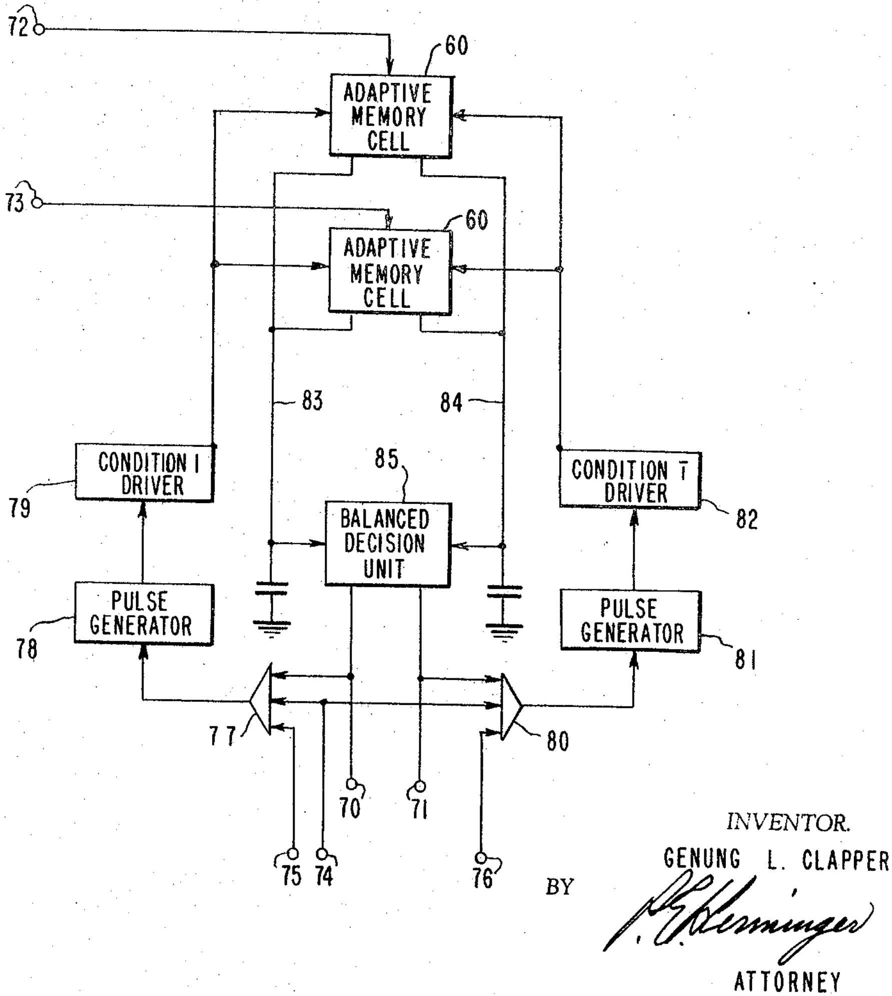
FIG. 7 is a diagrammatic representation of one adaptive memory circuit which may be employed with the adaptive memory device according to the invention.

In FIG. 6 there is shown an elementary and illustrative form of a circuit which will advantageously employ the device of the present invention as an adaptive memory for use in, for example, computing systems, control systems, bionic systems, or the like. In FIG. 7 is shown the illustrative adaptive memory cell circuit of FIG. 6 employed in one illustrative adaptive memory configuration.

In FIG. 6, the symbol indicated generally at 10 denotes the dual coherer 10 of FIGS. 1 and 2, although, of course, the coherer 20 of FIG. 3 may also be employed. As indicated, device 10 is arranged in a cell indicated generally at 60 and constituting all the elements of FIG. 6. Device 10 has dual coherer parts 13 and 14 and terminals 12, 16, 18 arranged as already described in connection with FIGS. 1 and 2. Terminal 12 is now regarded as an input terminal to cell 60. Terminals 18 and 16 are connected to the conditioning terminals of cell 60, indicated at 40 and 41 respectively, via diodes 42, 44 and capacitors 43, 45 respectively. Grounded resistors 46, 47 serve as references. Also connected to terminals 18, 16 via resistors 48, 49 are the weight terminals of cell 60, indicated at 50, 51.

The terminal 12 is connected to a source of input pulses, while the terminals 40, 41 are connected to sources of conditioning pulses, as further detailed hereinbelow. Terminal 40 may be regarded as the condition 1 input to cell 60 while terminal 41 is the condition $\bar{1}$ input. The input terminal 12 may be arranged to be negative during the off level, and to carry a positive going pulse during the on level. The input signal to terminal 12 thus controls the weights and acts as a gate for conditioning pulses on 40 or 41. For example, a negative going pulse on the condition 1 input terminal 40 in conjunction with a positive going pulse at input 12 causes current to flow from 12 through coherer part 14 through forward polarized diode 42 to charge capacitor 43. This surge of current, as already explained, decoheres part 14 and coheres part 13 in coherer 10. Since the impedance of part 14 increases and that of part 13 decreases, impedance has been shifted from side 13 to side 14, and therefore, a weight has been shifted from side 14 to side 13. Consequently terminal 51 is the condition 1 weight terminal, and terminal 50 is the condition $\bar{1}$ weight terminal.

Similarly, a condition $\bar{1}$ input pulse at terminal 41 in conjunction with an input pulse at terminal 12, would cause a current surge through coherer part 13, diode 44, to capacitor 45, resulting in a weight shift to terminal 50 constituting the condition $\bar{1}$ weight terminal. When input 12 is at the off level, no conditioning can take place despite the existance of conditioning pulses at terminals 40, 41.

In FIG. 7 is shown two adaptive memory cells 60 employed in an appropriate illustrative circuit. While two cells are shown it will be understood that a plurality of cells are employed matching the number of inputs, the said plurality constituting a bank controlling collectively a single binary output. Specifically, the binary output of the system is indicated at terminals 70, 71 being respectively binary 0 and 1. Two inputs out of any desired plurality are shown at 72, 73, while the conditioning input to the system is shown at 74. The desired binary outputs 1 and 0 are applied at terminals 75, 76 respectively.

The plurality of cells 60 is connected to input terminals 72, 73 and to conditioning circuits 77, 78, 79 and 80, 81, 82 respectively. Pulse generators 78, 81 are conventional pulse generators which provide a pulse output of predetermined amplitude and duration in response to an appropriate signal from AND circuits 77, 80 respectively. Pulse generators 78, 81 control condition 1 driver 79 and condition $\bar{1}$ driver 82 respectively. Drivers 79, 82 are conventional pulse amplifiers adapted to provide suitable pulse power to drive the plurality of cells 60 in the bank. The weight output terminals of each cell 60 are connected into weight summation lines 83, 84. In the illustrative circuit with the illustrative cells 60, line 83 constitutes the summation line for condition $\bar{1}$ weights and line 84 constitutes the summation line for condition 1 weights. Lines 83, 84 are connected to balanced decision unit 85, which may be, for example, a voltage comparator of the type shown in United States Patent 3,054,910 or 2,949,546. Unit 85 provides a binary output of 0 or 1 on lines 70, 71 depending on whether there are more memory cells 60 supplying output weights on line 83 or on line 84.

To condition the system, known predetermined inputs may be applied to terminals 72, 73. Where a large number of memory cells 60 and input terminals are employed, a partiticular pattern of predetermined inputs may be applied. The output therefrom taken at terminals 70, 71 will simultaneously be read by AND circuits 77, 80, together with the desired output at terminal 74. If the actual output does not correspond to the desired output the appropriate AND circuit will, upon energization of conditioning line terminal 75, 76, supply conditioning pulses to the cells 60.

Depending therefore on which way the disparity between actual output and desired output is disposed, either the condition 1 driver 79 or the condition $\bar{1}$ driver 82 will adjust the weights of those cells 60 having at that moment active inputs 72, 73. In this way the system may be trained to recognize an input pattern and produce the appropriate binary output. Of course, the illustrative circuit may be employed as an adaptive circuit in other manners than that just described for illustration.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An adaptive memory device comprising a first body of coherable particles, a second body of coherable particles arranged adjacent to but spaced from said first body, a first circuit through said first body, a second circuit through said second body, said first and second circuits having one end thereof in common, conditioning signal generating means connected to said first and second circuits and adapted to pass a decohering current selectively through either one of said circuits, and weight sensing means connected to said first and second circuits and adapted to compare the relative impedance thereof.

2. An adaptive memory device according to claim 1 wherein an end of said first circuit comprises a first electrical terminal communicating with said first body, an end of said second circuit comprises a second electrical terminal communicating with said second body, and said common one end of said first and second circuits comprises a third electrical terminal communicating with a substantial area of both said bodies and constituting means for maintaining said bodies in said mutually adjacent but spaced relationship.

3. An adaptive memory device comprising a first body of coherable particles bound in an insulating binder to form a solid homogeneous body, a second body of coherable particles bound in an insulating binder to form a solid homogeneous body, said second body being arranged spaced apart but adjacent to said first body, a first electrical terminal communicating with said first body, a second electrical terminal communicating with said second body, a third electrical terminal communicating with both said first and second bodies, said first and third terminals constituting a first pair and said second and third terminals constituting a second pair, and means connected to said terminals and adapted to pass a decohering current selectively between either one of said pairs individually whereupon an increase in impedance across a selected pair is accompanied by a decrease in impedance across the other pair.

4. An adaptive memory device comprising a first body of coherable particles, a second body of coherable particles arranged adjacent to said first body but spaced therefrom and out of contact therewith, and means connected to said bodies and adapted to pass a decohering current selectively through either one of said bodies individually which action increases the coherence of the other one of said bodies.

5. An adaptive memory device comprising a first body of coherable particles bound in an insulating binder to form a solid homogeneous body, a second body of coherable particles bound in an insulating binder to form a solid homogeneous body, said second body being arranged adjacent to said first body but spaced therefrom and out of contact therewith, and means connected to said bodies and adapted to pass a decohering current selectively through either one of said bodies, individually which action increases the coherence of the other one of said bodies.

6. An adaptive memory device comprising a first body of coherable particles, a second body of coherable particles arranged adjacent to said first body, but spaced therefrom and out of contact therewith, a first electrical terminal communicating with said first body, a second electrical terminal communicating with said second body, a third electrical terminal communicating with both said first and second bodies, said first and third terminals constituting a first pair and said second and third terminals constituting a second pair, and means connected to said terminals and adapted to pass a decohering current selectively between either one of said pairs individually whereupon an increase in impedance across a selected pair is accompanied by a decrease in impedance across the other pair.

7. An adaptive memory device comprising a first body of coherable particles, a second body of coherable particles, a first electrical terminal communicating with said first body, a second electrical terminal communicating with said second body, a third electrical terminal communicating with both said bodies and constituting means for maintaining said bodies spaced apart adjacent one another, said first and third terminals constituting a first pair and said second and third terminals constituting a second pair, and means connected to said terminals and adapted to pass a decohering current selectively between either one of said pairs individually whereupon an increase in impedance across a selected pair is accompanied by a decrease in impedance across the other pair.

8. An adaptive memory device comprising a first body of coherable particles, a second body of coherable particles, a first electrical terminal communicating with said first body, a second electrical terminal communicating with said second body, a third electrical terminal communicating with a substantial area of both said bodies and constituting means for maintaining said bodies spaced apart adjacent one another, said first and third terminals constituting a first pair and said second and third terminals constituting a second pair, and means connected to said terminals and adapted to pass a decohering current selectively between either one of said pairs individually whereupon an increase in impedance across a selected pair is accompanied by a decrease in impedance across the other pair.

References Cited by the Examiner

UNITED STATES PATENTS

| | | | |
|---|---|---|---|
| 1,167,163 | 6/1914 | Frank | 340—173 |
| 2,923,920 | 2/1960 | Fitch | 340—173 |

BERNARD KONICK, *Primary Examiner.*

T. W. FEARS, *Assistant Examiner.*